Dec. 23, 1958  J. W. PRESLEY  2,865,394
SAMPLING VALVE FOR HIGH MELT MATERIALS
Filed Oct. 4, 1957
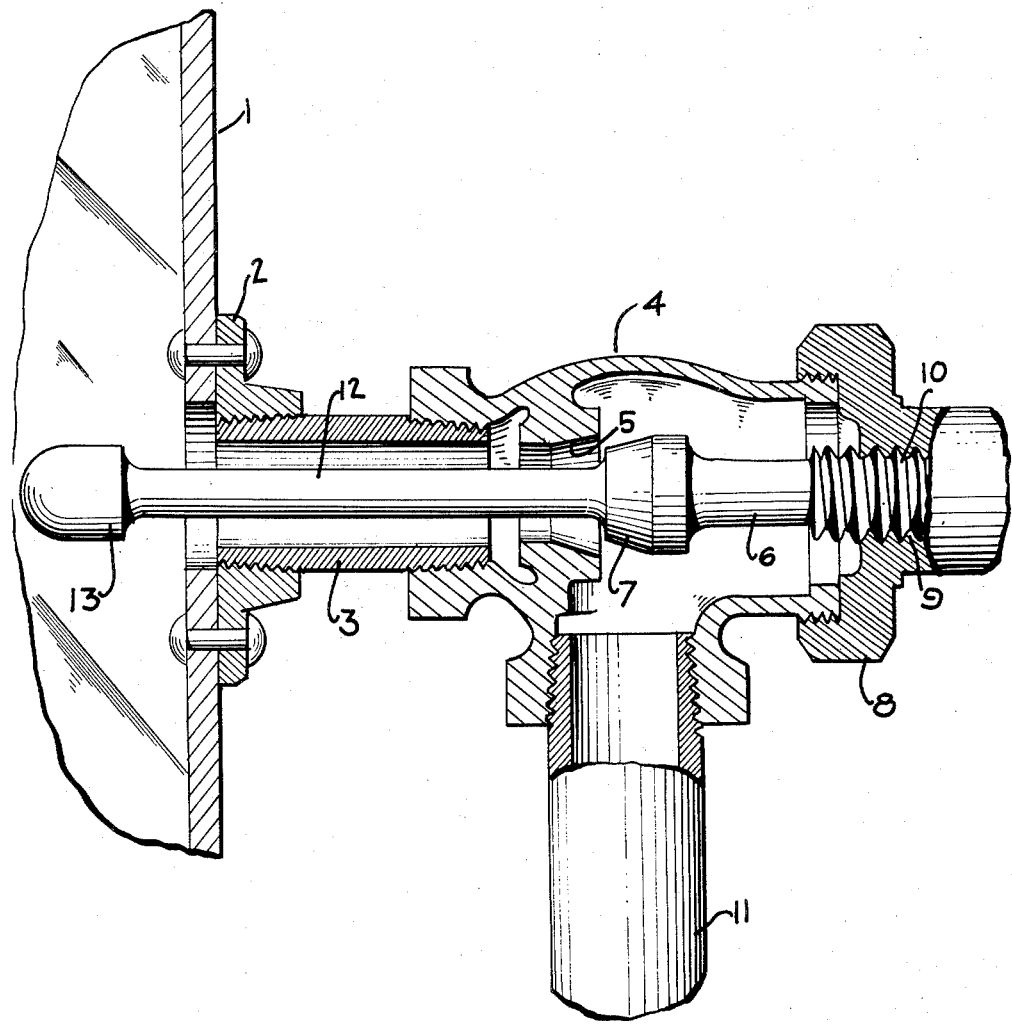
INVENTOR
Jerry W. Presley
BY
ATTORNEY

United States Patent Office 2,865,394
Patented Dec. 23, 1958

2,865,394

SAMPLING VALVE FOR HIGH MELT MATERIALS

Jerry W. Presley, Augusta, Kans., assignor to Socony Mobil Oil Company, Inc., a corporation of New York Application October 4, 1957, Serial No. 688,309

1 Claim. (Cl. 137—334)

Considerable difficulty has always been had with sample valves for securing samples from containers, such as tanks containing high melt materials, such as asphalts, coal tar pitches and the like, which are solid or highly viscous at atmospheric temperatures and which are maintained in liquid condition in heated insulated storage.

Since the valves usually protrude from the tank some distance, in order to extend outside the insulation, and since the ratio of surface to volume of the valve and even a short connecting pipe is quite high, the material within the valve and connecting pipe cools, and, particularly in winter in rigorous climates, may become solid and plug the valve. Even if it is not solid, it is usually so cold that its flow is quite sluggish, and when it is desired to take a sample, an inordinately large amount of material must be withdrawn to assure of freedom from material which might have stagnated in the valve and not be representative of the tank contents.

It is an object of this invention to provide a sampling valve for use in such situations in which the material within the valve and its connecting pipe may be held more nearly at the container temperature, avoiding these difficulties.

This invention is based upon the use of a modified rising stem valve wherein an extension of the stem is utilized for the conduction of heat into the material within the closed valve and its connecting pipe.

To more fully understand this invention, reference is made to the single drawing which is made a part hereof.

In this drawing, which is diagrammatic in nature, and partially in section, 1 represents the wall of a tank or container holding a high melt material, such as for example 185° F. Soft point coal tar pitch, which is maintained therein at a temperature above its melting point, usually of the order of 215° F. or more. 2 is a flange upon the tank wall, and 3 is a pipe nipple, supporting a valve 4. The valve, which is preferably an "angle" type valve, consists of a body 4, a seat 5, a stem 6, on which is carried a valve disc 7, a bonnet 8, carrying threads 9, mating with threads 10 on stem 6 whereby the stem is receded and advanced. (The upper part of the bonnet with its packing gland and nut, and the outward extension of the stem with its handwheel are omitted for simplicity.) The valve discharges through a pipe 11. This valve differs from the usual valve in that the stem 6 has an extension 12, long enough to reach into the material in the tank 1, and this extension preferably ends in an expanded knob or ball 13. (While the stem 6, disc 7, and extensions 12, 13, are shown integral in construction, they may be assembled of several pieces, as will occur to any machinist.)

The purpose of extension 12 and its enlarged end 13, if it has one, is to reach far enough into the heated material in the tank to pick up heat and transfer that heat back to the material within connecting pipe 3 and below seat 5 when the valve is closed. Since metals, and particularly the bronzes of which such valve parts are commonly made, are much better conductors of heat than the fluids of which I speak, it is possible to keep the fluid within the pipe at or near the tank fluid temperature, dependent somewhat on the length of the pipe 3.

It will be noted that the length of extension 12 is dependent upon that of pipe 3. So also, to some extent, is the diameter of extension 12, and the use of, and dimension of enlargement 13. Enlargement 13 should, obviously, be small enough to pass seat 5 in the usual case. If pipe 3 is long, the cross-section of extension 12 should be somewhat enlarged to carry more heat, and the length of extension 12, with or without enlargement 13 exposed in the tank should be enough to pick up the heat required. The sizing is a rather simple matter, based upon well-known methods of calculating heat conductance and heat transfer.

I claim:

A device for sampling high melt materials maintained as liquid in a container comprising a rising stem valve, means for connecting the valve to the wall of the container, in said valve a seat, on the stem thereof a valve disc, and a metallic extension of said stem beyond the valve disc, said extension being of length sufficient to pass through said valve connecting means and into the body of liquid within the container.

No references cited.